US010773590B2

(12) United States Patent
Nukii et al.

(10) Patent No.: US 10,773,590 B2
(45) Date of Patent: Sep. 15, 2020

(54) WORK VEHICLE

(71) Applicant: Hitachi Construction Machinery Co., Ltd., Tokyo (JP)

(72) Inventors: Masaki Nukii, Ushiku (JP); Koji Hyodo, Kasumigaura (JP); Isamu Aoki, Tsukuba (JP); Tetsuji Tanaka, Abiko (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 393 days.

(21) Appl. No.: 15/754,300

(22) PCT Filed: Feb. 8, 2017

(86) PCT No.: PCT/JP2017/004651
§ 371 (c)(1),
(2) Date: Feb. 22, 2018

(87) PCT Pub. No.: WO2017/159133
PCT Pub. Date: Sep. 21, 2017

(65) Prior Publication Data
US 2018/0251026 A1  Sep. 6, 2018

(30) Foreign Application Priority Data
Mar. 16, 2016 (JP) .................................. 2016-052722

(51) Int. Cl.
*B60K 17/10* (2006.01)
*B60W 10/06* (2006.01)
(Continued)

(52) U.S. Cl.
CPC ............ *B60K 17/10* (2013.01); *B60W 10/04* (2013.01); *B60W 10/06* (2013.01);
(Continued)

(58) Field of Classification Search
CPC ...... F02D 41/02; F02D 41/0235; F02D 29/04; F01N 3/00; F01N 11/00; F01N 2610/00;
(Continued)

(56) References Cited

U.S. PATENT DOCUMENTS 9,322,316 B2 * 4/2016 Jung ..................... F01N 11/00
9,777,652 B2 * 10/2017 Jung ..................... F01N 3/021
(Continued)

FOREIGN PATENT DOCUMENTS

CN         101680209 B    1/2013
EP        2 857 591 A1    4/2015
(Continued)

OTHER PUBLICATIONS

International Search Report of PCT/JP2017/004651 dated May 16, 2017.

*Primary Examiner* — Thomas G Black
*Assistant Examiner* — Sara J Lewandroski
(74) *Attorney, Agent, or Firm* — Mattingly & Malur, PC

(57) ABSTRACT

The present invention relates to a work vehicle including an engine, a hydraulic pump, a hydraulic motor to drive wheels, an HST circuit in which the hydraulic pump and the hydraulic motor are connected to each other in the form of a closed circuit, a reducing agent sensor that detects the state of a reducing agent used to clean exhaust gas from the engine, and an engine restrictor that restricts the rotational speed of the engine based on the output from the reducing agent sensor, and the work vehicle further includes a control unit that changes the tilting angle of the hydraulic pump or the hydraulic motor independently of the rotational speed of the engine to a tilting angle associated with minimum travel drive force necessary for self-travel of the work vehicle when the control unit determines that the engine restrictor has restricted the rotational speed of the engine.

5 Claims, 12 Drawing Sheets

(51) Int. Cl.
  *B60W 10/103* (2012.01)
  *B60W 10/30* (2006.01)
  *F01N 3/08* (2006.01)
  *F02D 29/04* (2006.01)
  *B60W 10/04* (2006.01)
  *F02D 31/00* (2006.01)
  *F02D 41/02* (2006.01)
  *F01N 9/00* (2006.01)
  *F01N 3/20* (2006.01)
  *F01N 11/00* (2006.01)

(52) U.S. Cl.
  CPC .......... *B60W 10/103* (2013.01); *B60W 10/30* (2013.01); *F01N 3/08* (2013.01); *F02D 29/04* (2013.01); *F02D 31/001* (2013.01); *F02D 41/0235* (2013.01); *F01N 3/208* (2013.01); *F01N 9/00* (2013.01); *F01N 11/00* (2013.01); *F01N 2590/08* (2013.01); *F01N 2610/02* (2013.01); *F01N 2610/1406* (2013.01); *F01N 2900/0416* (2013.01); *F01N 2900/08* (2013.01); *F01N 2900/10* (2013.01); *F01N 2900/12* (2013.01); *F01N 2900/1814* (2013.01); *F02D 2200/101* (2013.01); *Y02A 50/2325* (2018.01)

(58) Field of Classification Search
  CPC ............. F01N 2610/02; F01N 2900/00; F01N 2610/04; F01N 2610/0416; B60W 10/04; B60W 10/08; B60W 10/30; B60W 30/18063; B60L 15/2063
  See application file for complete search history.

(56) References Cited

U.S. PATENT DOCUMENTS

| | | | |
|---|---|---|---|
| 2010/0139255 A1 | 6/2010 | Kamiya et al. | |
| 2015/0098783 A1* | 4/2015 | Hyodo | F02D 41/021 414/685 |
| 2015/0098784 A1* | 4/2015 | Hyodo | E02F 9/2066 414/685 |

FOREIGN PATENT DOCUMENTS

| | | | |
|---|---|---|---|
| JP | 2013-160104 A | | 8/2013 |
| JP | 2015-071974 A | | 4/2015 |
| JP | 2015-071975 A | | 4/2015 |
| JP | 2015-071976 A | | 4/2015 |
| JP | 2015-143509 A | | 8/2015 |
| JP | 2015-161306 A | | 9/2015 |
| JP | 2015161306 A | * | 9/2015 |

* cited by examiner

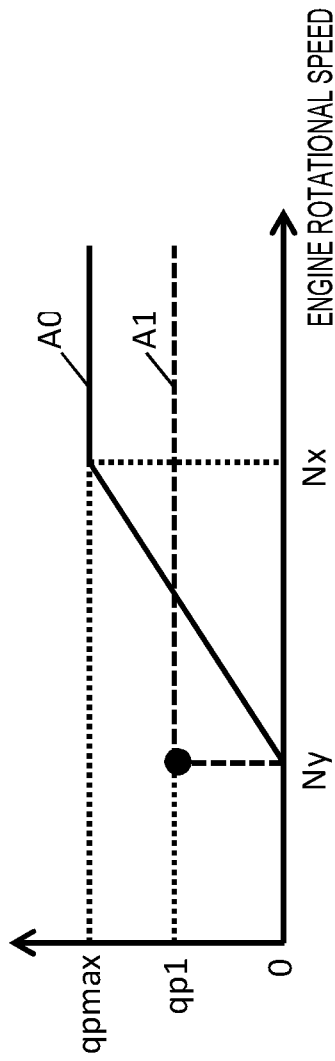
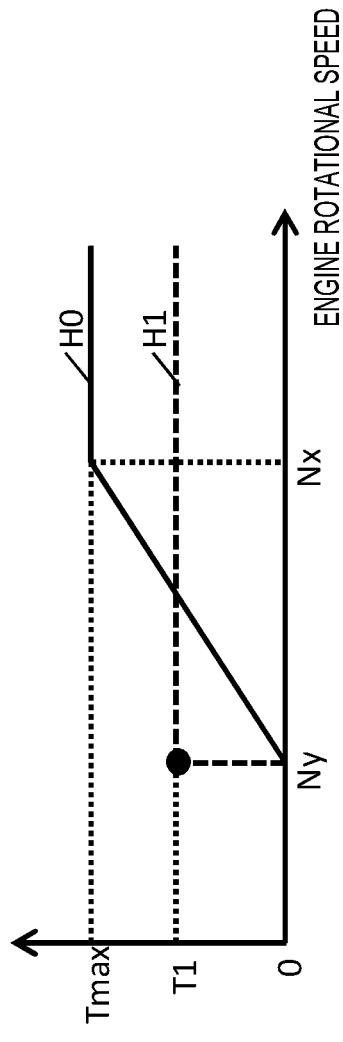
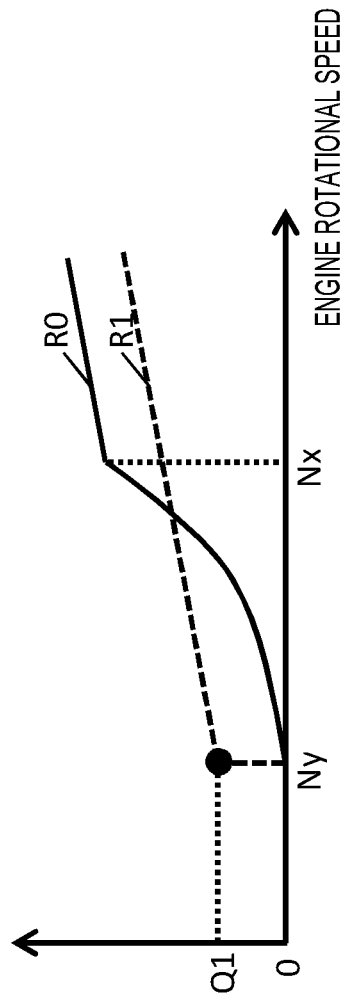
FIG. 6A
FIG. 6B
FIG. 6C

WORK VEHICLE

TECHNICAL FIELD

The present invention relates to a work vehicle.

BACKGROUND ART

A work vehicle represented by an HST (hydro static transmission) vehicle includes a reducing device in which a reducing agent cleans exhaust gas exhausted from an engine. There is a known configuration that starts restricting the engine rotational speed when the quantity of remaining reducing agent is smaller than or equal to a predetermined threshold and lowers the engine rotational speed to a low-idle speed to prevent high-power operation.

Patent Literature 1 discloses a configuration that prevents an engine from stalling when the work vehicle starts restricting the engine rotational speed.

CITATION LIST

Patent Literature

Patent Literature 1: Japanese Patent Laid-Open No. 2015-71976

SUMMARY OF INVENTION

Technical Problem

In the invention described in Patent Literature 1, there is no description of a case where the engine rotational speed is restricted to a low-idle speed. Therefore, in a case where an HST pump is set to start discharging the hydraulic oil when the engine rotational speed is higher than the low-idle speed, it is not clear that the HST vehicle can travel by itself.

For example, in the case where the HST pump is set to start discharging the hydraulic oil when the engine rotational speed is higher than the low-idle speed, and when the engine rotational speed is restricted to the low engine rotational speed, the HST pump does not discharge the hydraulic oil, and the work vehicle therefore cannot travel by itself.

Solution to Problem

A work vehicle according to an aspect of the present invention includes an engine, a hydraulic pump driven by the engine, a hydraulic motor driven with hydraulic oil discharged from the hydraulic pump to drive wheels, an HST circuit in which the hydraulic pump and the hydraulic motor are connected to each other in a form of a closed circuit, a reducing agent sensor that detects a state of a reducing agent used to clean exhaust gas from the engine, and an engine restrictor that restricts a rotational speed of the engine based on an output from the reducing agent sensor, and the work vehicle further includes a control unit that changes a tilting angle of the hydraulic pump or the hydraulic motor independently of the rotational speed of the engine to the tilting angle associated with minimum travel drive force necessary for self-travel of the work vehicle when the control unit determines that the engine restrictor has restricted the rotational speed of the engine.

Advantageous Effects of Invention

According to the present invention, an HST vehicle is allowed to travel by itself even in the state in which the engine rotational speed is restricted.

BRIEF DESCRIPTION OF DRAWINGS

FIG. 6 compares the characteristic of the pump volume of the hydraulic pump 2 between the restricted mode and the normal mode.

DESCRIPTION OF EMBODIMENTS

A first embodiment of a wheel loader that is an HST vehicle according to the present invention will be described below with reference to FIGS. 1 to 7.

(Configuration)

Figure 1:
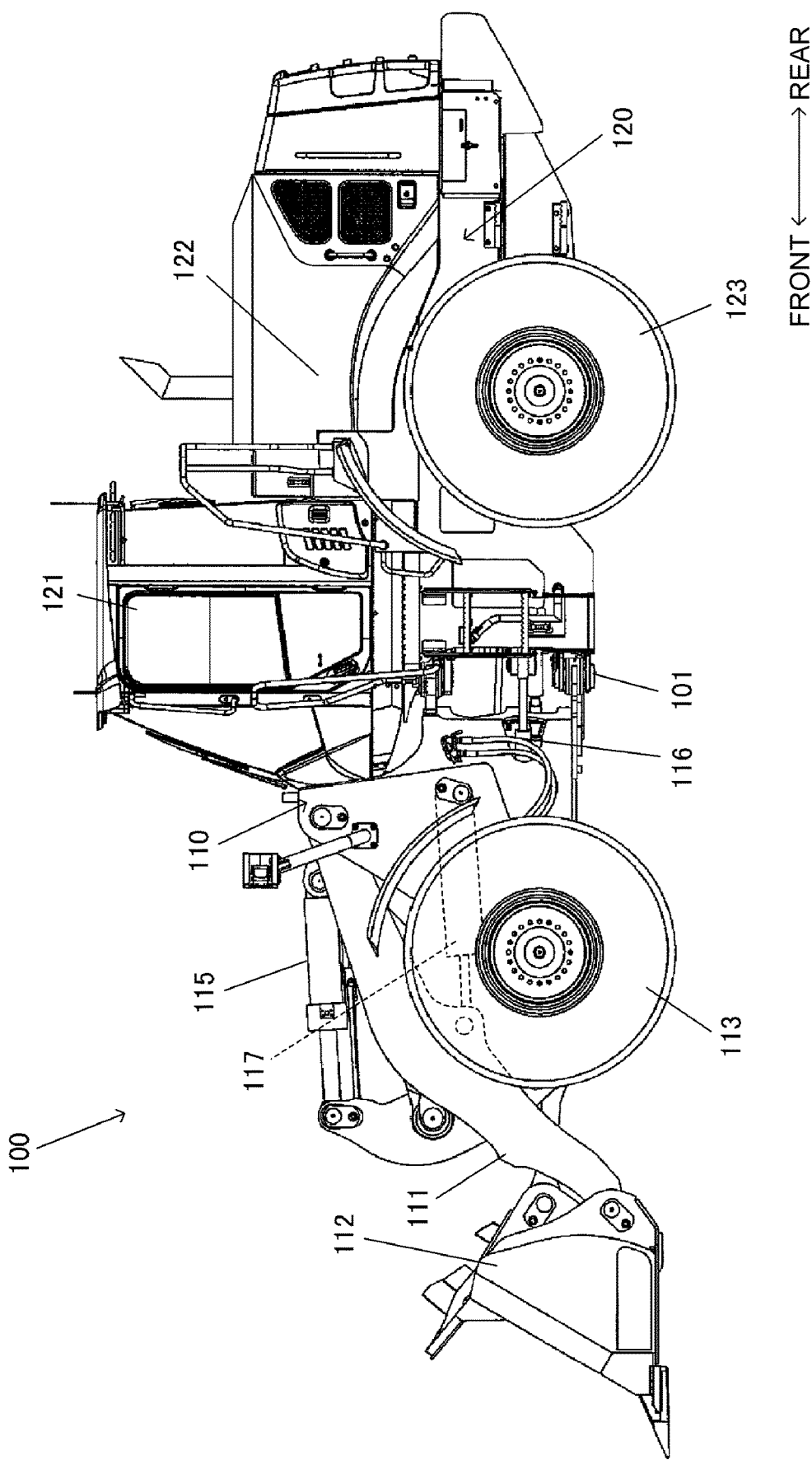
FIG. 1 is a side view of a wheel loader 100.

FIG. 1 is a side view of a wheel loader that is an example of an HST vehicle according to a first embodiment. A wheel loader 100 is formed of a front vehicle body 110, which includes an arm 111, a bucket 112, front wheels 113, and other components, and a rear vehicle body 120, which includes a cab 121, a machine room 122, rear wheels 123, and other components.

The arm 111 is driven by an arm cylinder 117 so as to pivot upward and downward (rise and lower), and the bucket 112 is driven by a bucket cylinder 115 so as to pivot upward and downward (crowd and dump). The front vehicle body 110 and the rear vehicle body 120 are pivotally linked to each other via a center pin 101, and the front vehicle body 110 bends rightward and leftward relative to the rear vehicle body 120 when a steering cylinder 116 extends and contracts.

The cab 121 includes an accelerator pedal 6, an accelerator pedal operation amount detector 6a, a forward/rearward changeover switch 16, an HST pump characteristic changing switch 20, and an engine key switch that is not shown, each of which will be described later. It is noted that the HST pump characteristic changing switch 20 is kept turned on in the first embodiment.

The machine room 122 accommodates an engine 1, which will be described later.

Figure 2:
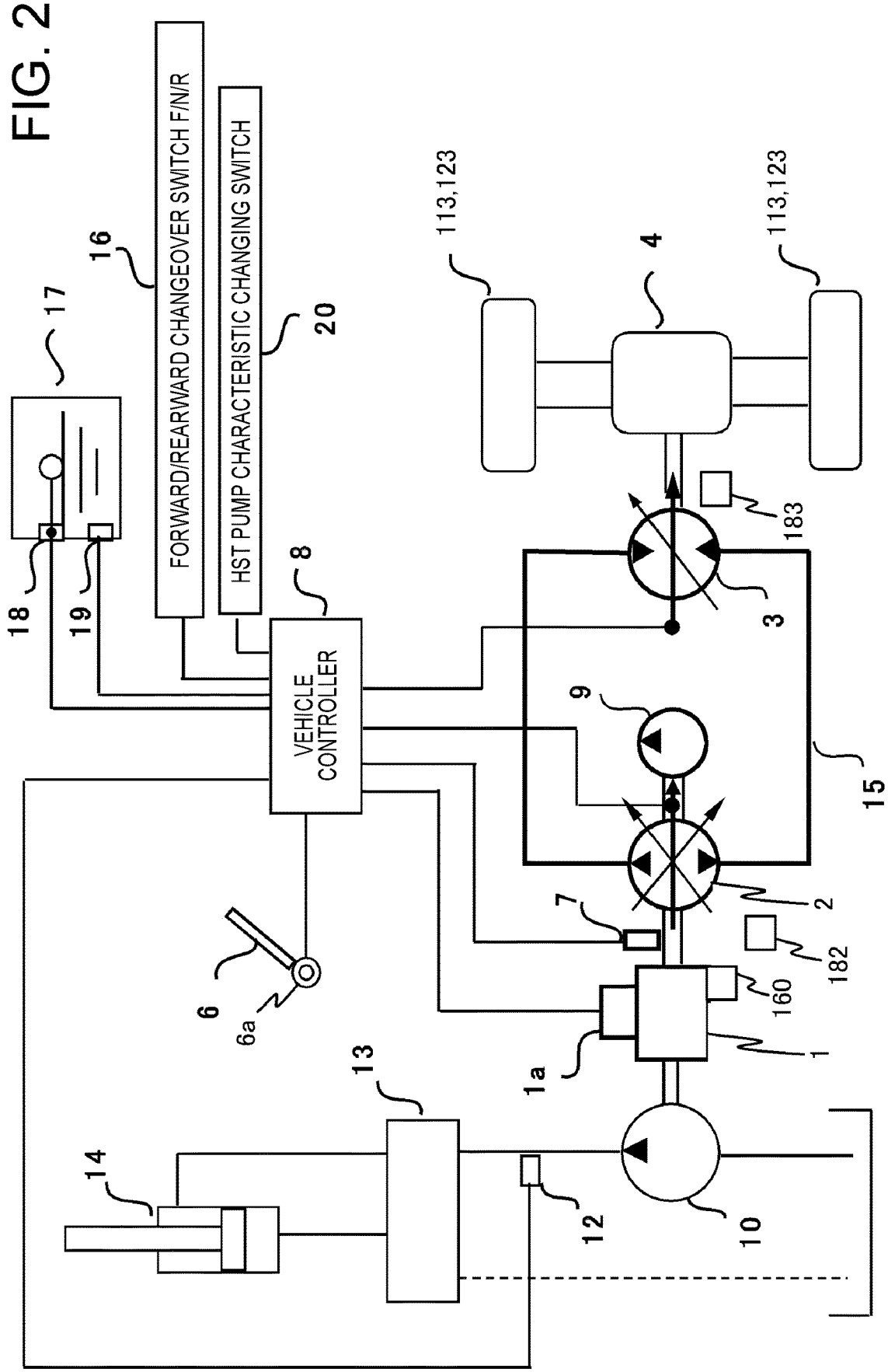
FIG. 2 shows a schematic configuration of the wheel loader 100.

FIG. 2 shows a schematic configuration of the wheel loader according to the first embodiment. The wheel loader includes what is called an HST travel driver (travel system) and includes a hydraulic pump 2, which is driven by the engine 1, and a hydraulic motor 3, which is connected to the hydraulic pump 2 in the form of a closed circuit, as shown in FIG. 2. When hydraulic oil discharged from the hydraulic pump 2 rotates the hydraulic motor 3, the output torque from the hydraulic motor 3 is transmitted via a gear box that is not shown, an output shaft that is not shown, and an axle 4 and rotates the wheels 113 and 123. The wheel loader 100 thus travels.

The rotational speed of the engine 1 is controlled by an engine controller 1a. In the present specification, the "rotational speed" is a physical quantity representing the number of rotations per unit time. The drive force produced by the engine 1 is transmitted to the hydraulic pump 2, an HST charge pump 9, and a fixed-volume hydraulic pump (hereinafter referred to as work pump 10).

The engine controller 1a is a microcomputer including a CPU, a ROM, and a RAM and controls the rotational speed of the engine 1 based on outputs outputted from a variety of sensors and received via a vehicle controller 8.

The hydraulic pump 2 is a swash-plate-type or bent-axis-type variable-displacement hydraulic pump, in which the displaced volume (hereinafter referred to as pump volume) qp is changed in accordance with the tilting angle. The pump volume qp of the hydraulic pump 2 is controlled by a pump regulator 182, which operates based on the output from the vehicle controller 8 and independently of the engine rotational speed.

The hydraulic motor 3 is a swash-plate-type or bent-axis-type variable-displacement hydraulic motor, in which the displaced volume (hereinafter referred to as motor volume) is changed in accordance with the tilting angle. The motor volume of the hydraulic motor 3 is controlled by a motor regulator 183, which operates based on the output from the vehicle controller 8 and independently of the engine rotational speed. The configuration and operation of the motor regulator 182 are the same as those of the pump regulator 182, and the action of the pump regulator 182 will therefore be representatively described below. In the first embodiment, the motor volume is fixed at a constant value.

(Action of Pump Regulator)

Figure 3:
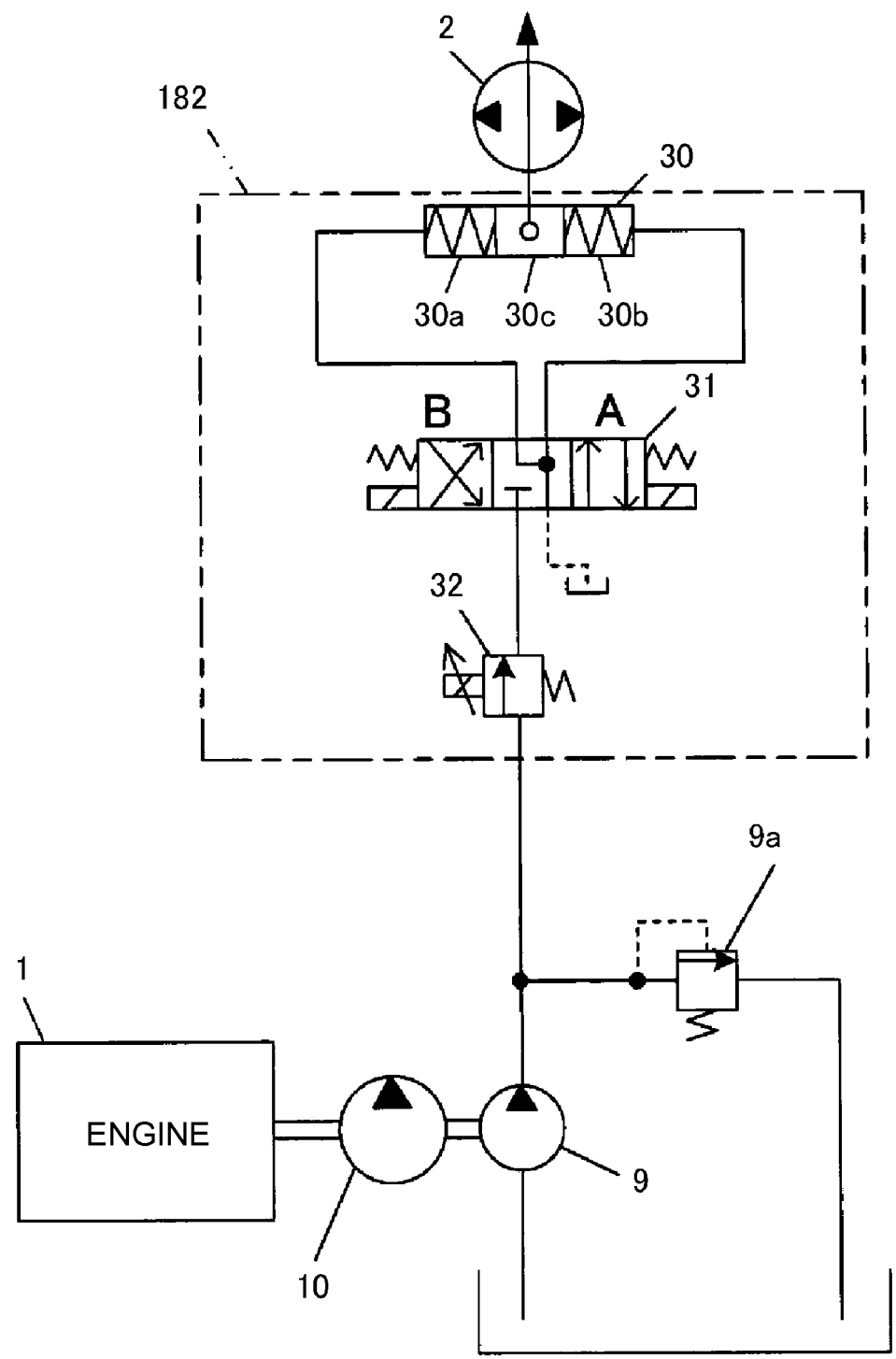
FIG. 3 shows the configuration of a pump regulator 182.

FIG. 3 shows the configuration of the pump regulator 182 in FIG. 2. The pump regulator 182 includes a tilting cylinder 30, a forward/rearward changeover valve 31, which changes its state in accordance with operation of the forward/rearward changeover switch 16, and a proportional solenoid pressure reducing valve (hereinafter referred to as proportional solenoid valve 32) that adjusts control pressure in accordance with a control signal from the vehicle controller 8, as shown in FIG. 3.

The pressure of the hydraulic oil from the HST charge pump 9 driven by the engine 1 is reduced via the proportional solenoid valve 32 and supplied as the control pressure to the tilting cylinder 30 via the forward/rearward changeover valve 31. The discharge pressure (primary pressure) of the HST charge pump 9 is defined by a relief valve 9a to be a predetermined value. The control pressure is supplied to the tilting cylinder 30 via the forward/rearward changeover valve 31, so that the pump volume qp is controlled in accordance with the control pressure, and the action direction of the tilting cylinder 30 is controlled in accordance with the switching operation performed by the forward/rearward changeover valve 31, whereby the tilting direction of the hydraulic pump 2 is controlled.

The forward/rearward changeover valve 31 changes its state in accordance with a control signal outputted from the vehicle controller 8 in accordance with the position of the forward/rearward changeover switch 16. The control pressure is supplied to the tilting cylinder 30 via the forward/rearward changeover valve 31, so that the action direction and action amount of the tilting cylinder 30 are controlled. As a result, the tilting direction and the pump volume qp of the hydraulic pump 2 are controlled.

When the forward/rearward changeover switch 16 is switched to a neutral (N) position, oil chambers 30a and 30b of the tilting cylinder 30 each have a tank pressure, so that a piston 30c is located in the neutral position. The pump volume qp of the hydraulic pump 2 is therefore zero, and the pump discharge flow rate is zero accordingly.

When the forward/rearward changeover switch 16 is switched to a forward (F) position, the forward/rearward changeover valve 31 is switched to the A side, so that the pressure of the hydraulic oil from the HST charge pump 9 is reduced by the proportional solenoid valve 32 and acts on the oil chamber 30a. On the other hand, the tank pressure acts on the oil chamber 30b. The difference in pressure between the oil chambers 30a and 30b of the tilting cylinder 30 is therefore produced, and the pressure difference displaces the piston 30c rightward in FIG. 3, so that the pump volume qp of the hydraulic pump 2 increases. The hydraulic pump 2 then rotates forward and discharges the hydraulic oil at a discharge flow rate according to the engine rotational speed and the pump volume qp.

When the forward/rearward changeover switch 16 is switched to a rearward (R) position, the forward/rearward changeover valve 31 is switched to the B side, so that the pressure of the hydraulic oil from the HST charge pump 9 is reduced by the proportional solenoid valve 32 and acts on the oil chamber 30b. On the other hand, the tank pressure acts on the oil chamber 30a. The difference in pressure between the oil chambers 30a and 30b of the tilting cylinder 30 is therefore produced, and the pressure difference displaces the piston 30c leftward in FIG. 3, so that the pump volume qp of the hydraulic pump 2 increases. The hydraulic pump 2 then rotates rearward and discharges the hydraulic oil at a discharge flow rate according to the engine rotational speed and the pump volume qp.

The description will be resumed with reference to FIG. 2 again.

The hydraulic motor 3 is a variable-displacement hydraulic motor. The volume of the hydraulic motor 3 (hereinafter referred to as motor volume) is controlled by the vehicle controller 8. The hydraulic motor 3 is drive by the hydraulic oil discharged from the hydraulic pump 2 connected to the hydraulic motor 3 via an HST circuit 15.

A rotational speed sensor 7 detects the rotational speed of the engine 1 and outputs the result of the detection, for example, in the form of a current signal to the vehicle controller 8.

The vehicle controller 8 includes a computation processor including a CPU, a ROM and a RAM, each of which is a storage device, and other peripheral circuits. The vehicle controller 8 is, so to speak, a portion that controls the wheel loader 100. The accelerator pedal operation amount detector 6a, which detects a pedal operation amount by which the accelerator pedal 6 is operated (pedal stroke or pedal angle), and the rotational speed sensor 7 are connected to the vehicle controller 8, as shown in FIG. 2.

The vehicle controller 8 outputs the pedal operation amount representing the amount of operation performed on the accelerator pedal 6 and detected with the accelerator pedal operation amount detector 6a to the engine controller 1a.

The forward/rearward changeover switch 16, which instructs forward/rearward motion of the vehicle, is connected to the vehicle controller 8, and the vehicle controller 8 detects the position of the operated forward/rearward changeover switch 16 (forward (F)/neutral (N)/rearward (R)). The vehicle controller 8 outputs a control signal in accordance with the position of the operated forward/rearward changeover switch 16 to the forward/rearward changeover valve 31 shown in FIG. 3.

The vehicle controller 8 is connected to the engine controller 1a, the hydraulic pump 2, the hydraulic motor 3, the accelerator pedal operation amount detector 6a, the rotational speed sensor 7, a pressure sensor 12, the forward/rearward changeover switch 16, a urea remaining quantity sensor 18, a urea quality sensor 19, and the HST pump characteristic changing switch 20 via signal lines. The vehicle controller 8 transmits signals themselves received from the accelerator pedal operation amount detector 6a, the urea remaining quantity sensor 18, and the urea quality sensor 19 or information contained in the signals to the engine controller 1a.

The wheel loader 100 includes a front work apparatus (work system) including the work pump 10, a control valve 13, an actuator 14, the arm 111 (FIG. 1), and the bucket 112 (FIG. 1). The work pump 10 is driven by the engine 1 and discharges hydraulic oil.

The hydraulic oil discharged from the work pump 10 is supplied to the work actuator 14 via the control valve 13 and drives the actuator 14. The control valve 13 is operated via a control lever that is not shown and controls the flow of the hydraulic oil from the work pump 10 to the actuator 14. In FIG. 2, the arm cylinder 117 and the bucket cylinder 115 are collectively referred to as the actuator 14, and an arm control valve or a bucket control valve is collectively referred to as the control valve 13 for convenience.

An exhaust gas purifying device 160 includes a processing apparatus (not shown) that uses, for example, a urea aqueous solution (hereinafter referred to as urea water) as a reducing agent to clean nitrogen oxides in the exhaust gas exhausted from the engine 1, a urea water tank 17, which stores the urea water supplied to the processing apparatus, the urea remaining quantity sensor 18, which detects the quantity of remaining urea water in the urea water tank 17, and the urea quality sensor 19.

(Action of Engine Controller)

The engine controller 1a sets a target engine rotational speed of the engine 1 and controls a fuel injector (not shown) to cause the actual rotational speed of the engine 1 to approach the set target engine rotational speed. The engine controller 1a has the following two action modes that affect the setting of the target engine rotational speed: a normal mode; and a restricted mode.

In the normal mode, the engine controller 1a determines the target engine rotational speed based on the pedal operation amount received from the vehicle controller 8. In the restricted mode, the engine controller 1a sets the target engine rotational speed of the engine 1 to be a low-idle speed irrespective of the pedal operation amount received from the vehicle controller 8. It is noted that the engine controller 1a gradually lowers the rotational speed of the engine 1 to prevent abrupt change in the engine rotational speed.

The engine controller 1a switches the action mode that is the normal mode when the engine starts operating between the normal mode and the restricted mode based on the outputs outputted from the urea remaining quantity sensor 18 and the urea quality sensor 19 and received from the engine controller 1a. That is, the engine controller 1a switches the action mode to the restricted mode when the quantity of the remaining urea water is smaller than a predetermined threshold or the quality of the urea water is lower than a predetermined threshold. On the other hand, the engine controller 1a switches the action mode to the normal mode when the quantity of the remaining urea water becomes greater than the predetermined threshold due, for example, to addition of urea water to the urea water tank 17 and the quality of the urea water becomes higher than the predetermined threshold. It is noted that the engine controller 1a does not output information on the change in the action mode or information on the current action mode to the vehicle controller 8. The state in which the urea water has high quality is a state in which the quality of the urea water falls within a predetermined range or a state in which the urea water has a small amount of impurities.

Figure 4:
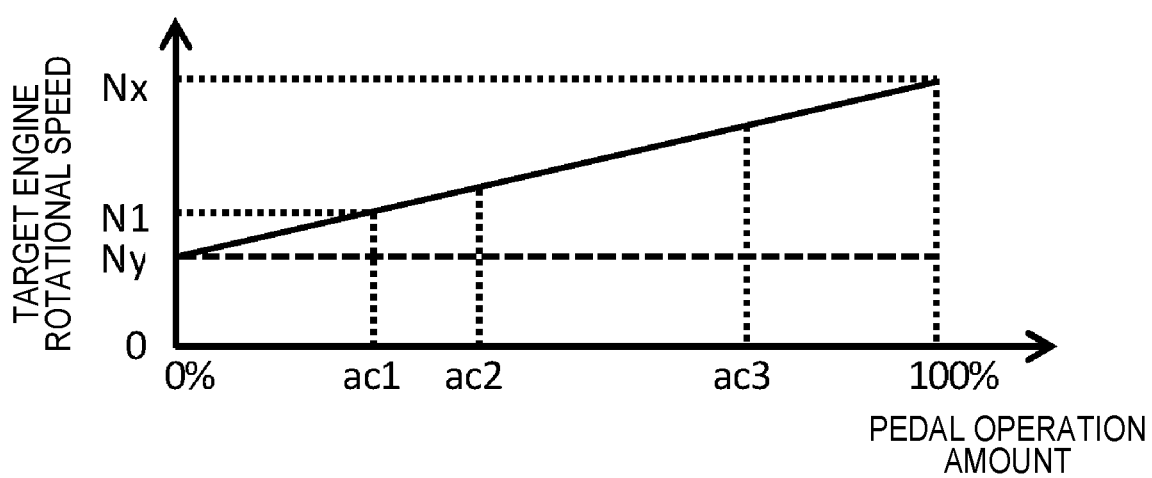
FIG. 4 shows the relationship between a pedal operation amount received from a vehicle controller 8 and a target engine rotational speed in a normal mode and a restricted mode.

FIG. 4 shows the relationship between the pedal operation amount received from the vehicle controller 8 and the target engine rotational speed in the normal mode and the restricted mode. In FIG. 4, the solid line represents the characteristic of the relationship in the normal mode, and the broken line represents the characteristic of the relationship in the restricted mode. It is noted in FIG. 4 that the pedal operation amount of 0% represents the minimum value thereof received from the vehicle controller 8, and that the pedal operation amount of 100% is the maximum value thereof received from the vehicle controller 8.

In the normal mode, the target engine rotational speed is set at a low-idle speed Ny in the case where the pedal operation amount is 0%, and the target engine rotational speed increases as the pedal operation amount increases. When the pedal operation amount reaches 100%, the target engine rotational speed is set at a high-idle speed Nx.

In the restricted mode, the target engine rotational speed is fixed to the low-idle speed Ny irrespective of the magnitude of the pedal operation amount.

(Action of Vehicle Controller)

The vehicle controller 8 has two action modes, the normal mode and the restricted mode. The vehicle controller 8 changes the method for determining the pump volume qp of the hydraulic pump 2 in accordance with the action mode. The vehicle controller 8 determines the pump volume qp based on the rotational speed of the engine 1 in the normal mode, whereas the pump volume qp is constant in the restricted mode.

The vehicle controller 8 estimates the action mode of the engine controller 1a based on the outputs outputted from the accelerator pedal operation amount detector 6a and the rotational speed sensor 7 and the outputs outputted from the urea remaining quantity sensor 18 and the urea quality sensor 19 and received from the engine controller 1a and changes the action mode of the vehicle controller 8 to the action mode of the engine controller 1a.

(Vehicle Controller 1 Normal Mode)

The vehicle controller 8 uses the pedal operation amount received from the accelerator pedal operation amount detector 6a to carry out processes described later and transmits the received pedal operation amount to the engine controller 1a.

Figures 5A, 5B, 5C:
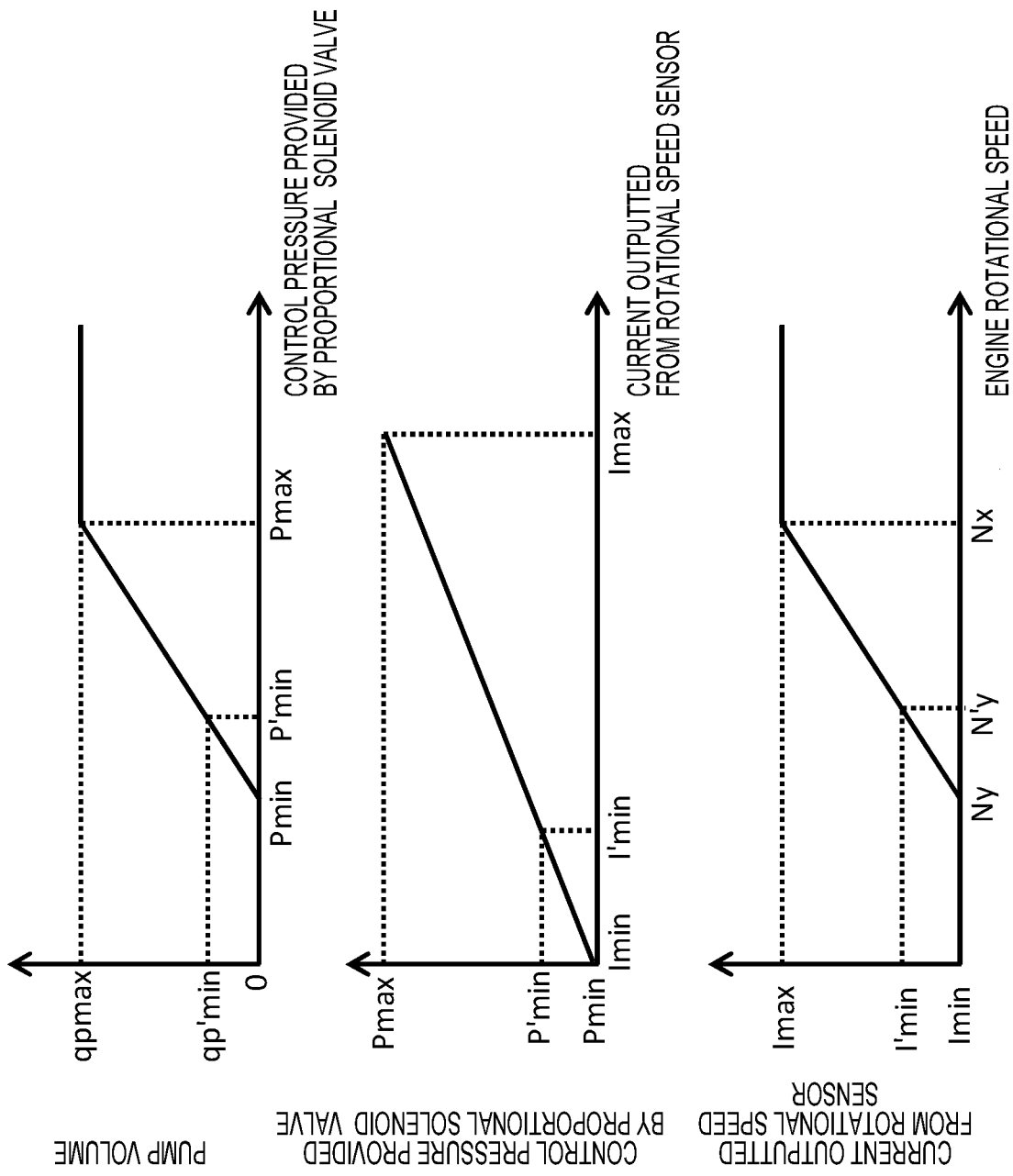
FIG. 5A shows the relationship between pump volume control pressure and a pump volume qp of a hydraulic pump 2.
FIG. 5B shows the relationship between current outputted by a rotational speed sensor 7 and pump volume control pressure.
FIG. 5C shows the relationship between the rotational speed of an engine 1 and the current outputted by the rotational speed sensor 7.

FIG. 5 shows a change in the pump volume qp of the hydraulic pump 2 in the normal mode. FIG. 5A shows the relationship between the control pressure determined based on the output from the vehicle controller 8 and provided by the proportional solenoid valve 32 (hereinafter referred to as pump volume control pressure) and the pump volume qp of the hydraulic pump 2. FIG. 5B shows the relationship between the current outputted by the rotational speed sensor 7 and the pump volume control pressure. FIG. 5C shows the relationship between the rotational speed of the engine 1 and the current outputted by the rotational speed sensor 7 to the vehicle controller 8.

In a case where the engine rotational speed is lower than the low-idle speed Ny, the current outputted from the rotational speed sensor 7 has a minimum value Imin, for example, 4 mA, as shown in FIG. 5C. The output current increases as the engine rotational speed increases to values greater than or equal to the low-idle speed Ny, and in a case where the engine rotational speed is higher than or equal to the high-idle speed Nx, the current outputted from the rotational speed sensor 7 has a maximum value Imax, for example, a constant value of 20 mA.

The tendency of increase/decrease in the current outputted from the rotational speed sensor 7 coincides with the tendency of increase/decrease in the pump volume control pressure; when the current outputted from the rotational speed sensor 7 has the minimum value Imin, the pump volume control pressure is Pmin, and when the current outputted from the rotational speed sensor 7 has the maximum value Imax, the pump volume control pressure is Pmax, as shown in FIG. 5B.

In a case where the pump volume control pressure is lower than Pmin, the pump volume qp of the hydraulic pump 2 is zero, as shown in FIG. 5A. The pump volume qp of the hydraulic pump 2 increases as the pump volume control pressure increases to values greater than or equal to Pmin, and in a case where the pump volume control pressure is higher than or equal to Pmax, the pump volume qp of the hydraulic pump 2 has a constant value qpmax. To allow the wheel loader 100 to move, it is necessary to achieve at least a pump volume of qp'min of the hydraulic pump 2 controlled at a tilting angle associated with minimum travel drive force necessary for the self-travel of the wheel loader 100. The control pressure provided by the proportional solenoid valve 32 and corresponding to the pump volume qp'min is P'min. The current outputted from the rotational speed sensor 7 and corresponding to the control pressure P'min provided by the proportional solenoid valve 32 is I'min. The engine rotational speed corresponding to the current I'min outputted from the rotational speed sensor 7 is N'y.

(Vehicle Controller Restricted Mode)

The method for determining the pump volume qp of the hydraulic pump 2 in the restricted mode will be described with reference to FIG. 6.

FIG. 6 compares the characteristic of the pump volume of the hydraulic pump 2 between the restricted mode and the normal mode. FIG. 6A shows the relationship between the engine rotational speed and the pump volume qp of the hydraulic pump 2. FIG. 6B shows the relationship between the engine rotational speed and the torque inputted to the hydraulic pump 2. FIG. 6C shows the relationship between the engine rotational speed and the discharge flow rate of the hydraulic oil from the hydraulic pump 2. In FIGS. 6A to 6C, characteristics A0, H0, and R0 drawn with solid lines represent the characteristics of the relationships in the normal mode, and characteristics A1, H1, and R1 drawn with broken lines represent the characteristics of the relationships in the restricted mode.

The characteristic A0 drawn with the solid line in FIG. 6A represents the characteristics in the normal mode shown in FIGS. 5A to 5C but organized into the relationship between the engine rotational speed and the pump volume qp of the hydraulic pump 2. On the other hand, the characteristic A1 drawn with the broken line in the restricted mode shows that the pump volume qp of the hydraulic pump 2 has a constant value qp1 in the case where the engine rotational speed is higher than or equal to the low-idle speed Ny. It is noted that qp1 is greater than or equal to qp'min, which is the minimum pump volume that allows self-travel of the wheel loader 100.

The torque inputted to the hydraulic pump 2 is also controlled in the same manner in which the displaced volume of the hydraulic pump 2 is controlled, as shown in FIG. 6B. That is, the characteristic H0 drawn with the solid line in the normal mode shows that the input torque is zero in the case where the engine rotational speed is lower than the low-idle speed Ny, that the input torque increases as the engine rotational speed increases in the case where the engine rotational speed is higher than or equal to the low-idle speed Ny, and that the input torque has a constant value Tmax in the case where the engine rotational speed is higher than or equal to the high-idle speed Nx. The characteristic H1 drawn with the broken line in the restricted mode shows that the input torque is zero in the case where the engine rotational speed is lower than the low-idle speed Ny, and that the input torque has a constant value T1 in the case where the engine rotational speed is higher than or equal to the low-idle speed Ny.

FIG. 6C shows the characteristic of the discharge flow rate of the hydraulic oil from the hydraulic pump 2. The characteristic R0 drawn with the solid-line in the normal mode shows that the pump displaced volume is zero in the case where the engine rotational speed is lower than the low-idle speed Ny and the discharge flow rate is therefore also zero. In the area where the engine rotational speed is higher than or equal to the low-idle speed Ny but lower than the high-idle speed Nx, since the pump displaced volume increases as the engine rotational speed increases, and the discharge flow rate increases in a quadric manner. When the engine rotational speed becomes higher than or equal to the high-idle speed Nx, the discharge flow rate of the hydraulic oil from the pump linearly increases because the pump displaced volume does not increase any more. The characteristic R1 drawn with the broken line in the restricted mode shows that the pump displaced volume is zero in the case where the engine rotational speed is lower than the low-idle speed Ny and the discharge flow rate is therefore also zero. In the case where the engine rotational speed is higher than or equal to the low-idle speed Ny, the discharge flow rate linearly increases as the engine rotational speed increases because the pump displaced volume is constant.

(Process of Determining Action Mode of Vehicle Controller 8)

The process of determining the action mode of the vehicle controller 8 will be described with reference to FIG. 7.

Figure 7:
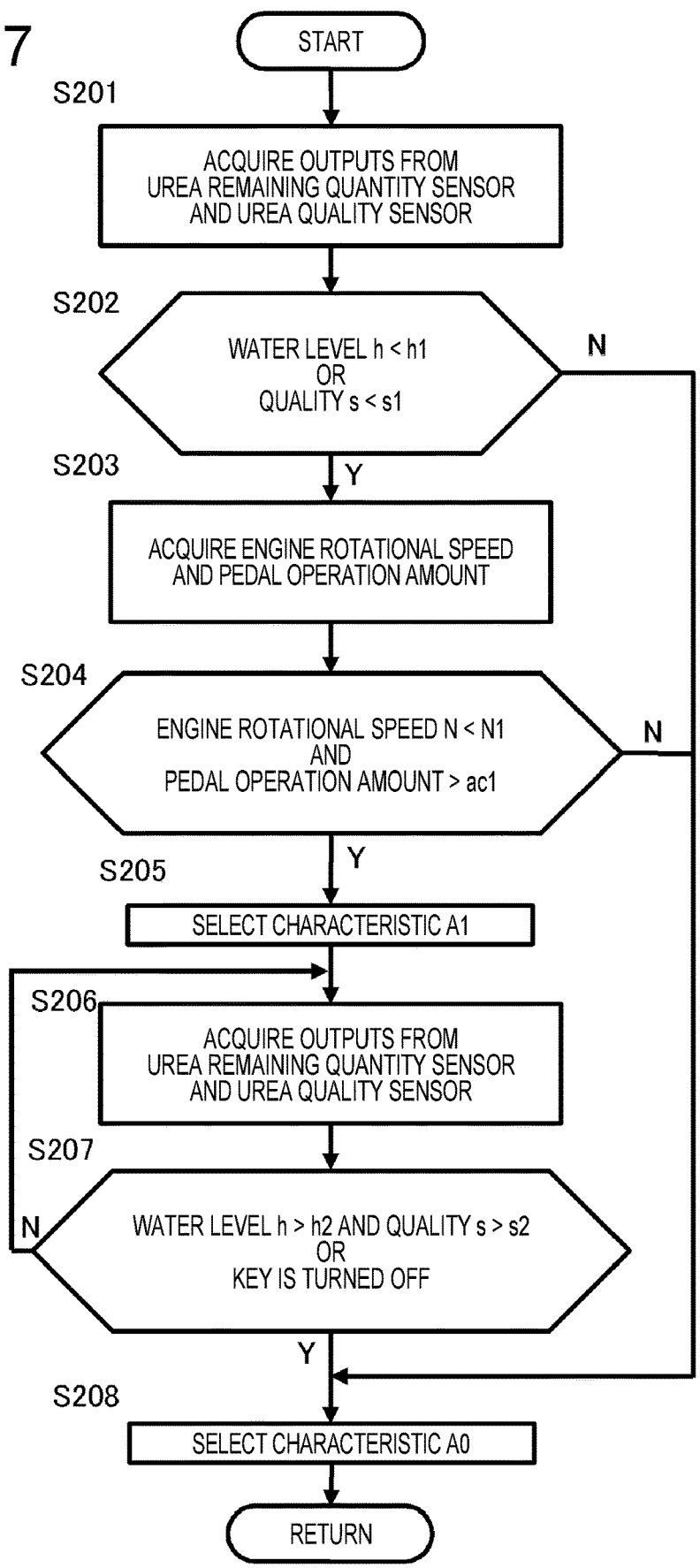
FIG. 7 is a flowchart showing the action of an action mode determining program.

FIG. 7 is a flowchart showing the action of a program that determines the action mode of the vehicle controller 8. Each step described below is actually carried out by the CPU in the vehicle controller 8.

In step S201, the CPU receives signals from the urea remaining quantity sensor 18 and the urea quality sensor 19, and in the subsequent step S202, the CPU evaluates whether or not the signals received in step S201 each satisfy a predetermined condition. When the CPU determines that the urea water level outputted by the urea remaining quantity sensor 18 is lower than a predetermined threshold h1 or the urea water quality s outputted by the urea quality sensor 19 is lower than a predetermined threshold s1, the CPU proceeds to step S203. When the CPU determines that the urea water level outputted by the urea remaining quantity sensor 18 is higher than or equal to the predetermined threshold h1 and the urea water quality s outputted by the urea quality sensor 19 is higher than or equal to the predetermined threshold s1, the CPU proceeds to step S208. In step S202, the CPU evaluates the possibility of whether the engine controller 1a is operating in the restricted mode, and when the CPU determines it is possible that the engine controller 1a is operating in the restricted mode, the CPU proceeds to step S203, whereas when the CPU determines it is not possible that the engine controller 1a is operating in the restricted mode, the CPU proceeds to step S208.

In step S203, the CPU receives signals from the accelerator pedal operation amount detector 6a and the rotational speed sensor 7, and in the subsequent step S204, the CPU evaluates whether or not the signals received in step S203 each satisfy a predetermined condition. In a case where the CPU determines that the engine rotational speed outputted by the rotational speed sensor 7 is lower than a predetermined rotational speed N1 and the pedal operation amount outputted by the accelerator pedal operation amount detector 6a is greater than a predetermined threshold (opening) ac1, the CPU proceeds to step S205. In a case where the CPU determines that the engine rotational speed outputted by the rotational speed sensor 7 is higher than or equal to the speed N1 or the pedal operation amount outputted by the accelerator pedal operation amount detector 6a is smaller than or equal to the threshold ac1, the CPU proceeds to step S208. In step S204, the CPU estimates whether or not the engine controller 1a is operating in the restricted mode, and when the CPU estimates that the engine controller 1a is operating in the restricted mode, the CPU proceeds to step S205, whereas when the CPU does not estimate that the engine controller 1a is operating in the restricted mode, the CPU proceeds to step S208.

In step S205, the CPU switches the action mode of the vehicle controller 8 to the restricted mode, selects the characteristic A1 as the characteristic of the pump displaced volume, and proceeds to step S206.

In step S206, the CPU receives signals from the urea remaining quantity sensor 18 and the urea quality sensor 19, as in step S201, and proceeds to step S207.

In step S207, the CPU evaluates whether or not the signals received in step S206 each satisfy a predetermined condition. In a case where the CPU determines that the urea water level h outputted by the urea remaining quantity sensor 18 is greater than a predetermined threshold h2 and the urea water quality s outputted by the urea quality sensor 19 is greater than a predetermined threshold s2 or the engine key switch is turned off, the CPU proceeds to step S208. In a case where the CPU determines that the urea water level outputted by the urea remaining quantity sensor 18 is smaller than or equal to the predetermined threshold h2 or the urea water quality outputted by the urea quality sensor 19 is smaller than or equal to the predetermined threshold s2 and the engine key switch that is not shown is maintained turned on, the CPU returns to step S206. In step S207, the CPU evaluates whether or not a condition that allows the engine controller 1a to transition from the restricted mode to the normal mode is satisfied, and when the CPU determines that the condition that allows the engine controller 1a to transition to the normal mode is satisfied, the CPU proceeds to step S208, whereas when the CPU determines that the condition that allows the engine controller 1a to transition to the normal mode is not satisfied, the CPU returns to step S206.

In step S208, which is carried out when the CPU determines or estimates that the engine controller 1a is operating in the normal mode, the CPU switches the action mode of the vehicle controller 8 to the normal mode, selects the characteristic AO as the characteristic of the pump displaced volume, and stops the action of the program shown in FIG. 7, which shows the action of the program.

(Overview of Action)

When the quantity of remaining urea water decreases during travel of the wheel loader 100, the engine controller 1a detects, for example, that the quantity of remaining urea water is smaller than a predetermined threshold and transitions to the restricted mode. In this state, even when an operator steps down the accelerator pedal 6, the engine rotational speed decreases to the low-idle speed Ny because the target engine rotational speed is fixed to the low-idle speed Ny.

When the operator keeps stepping on the accelerator pedal 6, the quantity of remaining urea water is small (YES in S202 in FIG. 7), and the relationship between the engine rotational speed and the pedal operation amount satisfies the predetermined condition (YES in S204 in FIG. 7), so that the vehicle controller 8 selects the characteristic A1. In the case of the characteristic A1, the pump volume has the constant value qp1, as shown in FIG. 6. Since qp1 is set to be greater than or equal to qp'min, which is the minimum pump volume of the hydraulic pump 2 controlled at the tilting angle associated with minimum travel drive force necessary for the self-travel of the wheel loader 100, as described above, the wheel loader 100 can travel by itself. Further, when the vehicle controller 8 temporarily selects the characteristic Al, the characteristic A1 is maintained even when the operator stops stepping on the accelerator pedal 6 and the pedal operation amount therefore becomes zero. That is, the wheel loader 100 performs what is called creeping travel, which allows the wheel loader 100 to travel even when the operator does not step on the accelerator pedal 6.

If the aforementioned control is not performed by the vehicle controller 8, the wheel loader 100 cannot travel by itself because the engine controller 1a fixes the target engine rotational speed to the low-idle speed Ny. However, since the wheel loader 100 includes the vehicle controller 8 having the configuration described above, the wheel loader 100 can travel by itself even when the engine controller 1a operates in the restricted mode. That is, the vehicle controller 8 increases the vehicle speed from zero to the speed in the creeping travel.

According to the first embodiment described above, the following advantageous effects are provided:

(1) The wheel loader 100 is an HST vehicle including the engine 1, the HST circuit 15, which includes the hydraulic pump 2, which is driven by the engine 1, and the hydraulic motor 3, which is driven with the hydraulic oil discharged from the hydraulic pump 2 to drive the wheels 113 and 123, a reducing agent sensor that detects the state of the reducing agent used to clean the exhaust gas from the engine 1, that is, the urea remaining quantity sensor 18 and the urea quality sensor 19, and an engine restrictor that restricts the rotational speed of the engine 1, that is, the number of rotations of the engine 1 based on the output from the reducing agent sensor, that is, the engine controller 1a. The wheel loader 100 further includes the vehicle controller 8, which controls the HST circuit to increase the vehicle speed of the vehicle when it is determined that the engine restrictor restricts the rotational speed of the engine 1, that is, the engine restrictor operates in the restricted mode.

The thus configured wheel loader 100 can travel by itself even in the state in which the engine rotational speed is restricted. Therefore, even when the engine controller 1*a* fixes the target engine rotational speed to the low-idle speed, the wheel loader 100 can escape from a dangerous place, such as the middle of a roadway and a place inside a railroad crossing.

(2) The vehicle controller 8, when it determines that the engine restrictor has restricted the rotational speed of the engine 1, increases the volume of the hydraulic pump 2.

Therefore, even in the state in which the rotational speed of the engine 1 is restricted, increasing the volume of the hydraulic pump 2 allows a large amount of energy to be extracted from the engine 1 for action of the wheel loader 100.

(3) The vehicle controller 8, when it determines that the engine restrictor has restricted the rotational speed of the engine 1 during travel of the vehicle, controls the HST circuit to prevent the vehicle from stalling.

The vehicle controller 8 sets the threshold N1 of the engine rotational speed for evaluating whether the engine controller 1*a* operates in the restricted state to at least be the engine rotational speed N'y corresponding to the pump volume qp that allows minimum power necessary for travel. Causing the vehicle controller 8 to transition to the restricted mode can therefore prevent the wheel loader 100 from stalling.

(Variation 1)

In the first embodiment described above, in the case where the vehicle controller 8 operates in the restricted mode, what is called creeping travel, in which drive force for driving the vehicle is produced even when the operator does not step on the accelerator pedal 6, is performed. It is noted that also in the restricted mode, the wheel loader 100 may be configured to travel only in a case where the accelerator pedal 6 is stepped down at least by a predetermined opening.

Figure 8:
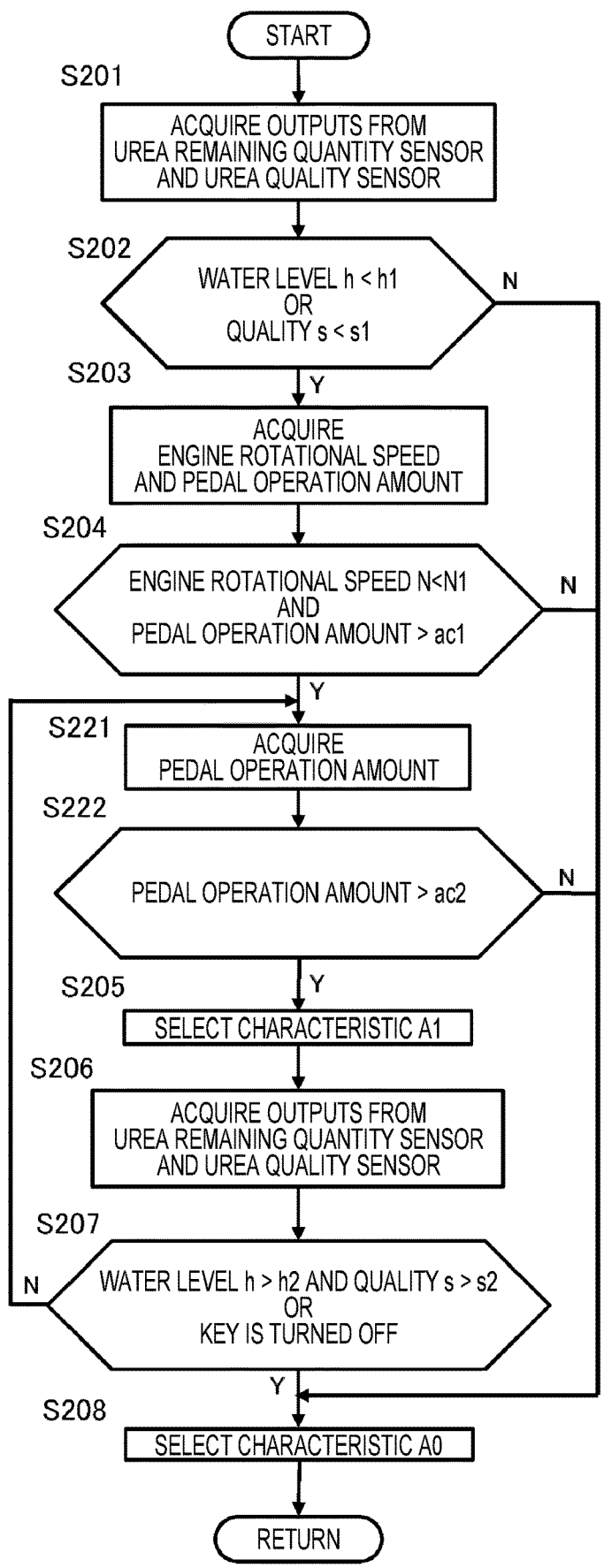
FIG. 8 is a flowchart showing the action of the action mode determining program in Variation 1.

FIG. 8 is a flowchart showing the action of the action mode determining program in Variation 1. The same processes as those in FIG. 7 in the first embodiment have the same step numbers and will not be described.

Steps S201 to S204 are the same as those in the first embodiment and will not therefore be described. In step S221, which is carried out when affirmative determination is made in step S204, the CPU reads the pedal operation amount of the accelerator pedal 6 in step S221 and proceeds to step S222.

In step S222, the CPU evaluates whether or not the pedal operation amount read in step S221 is greater than a predetermined threshold ac2. In a case where the CPU determines that the pedal operation amount is greater than the threshold ac2, the CPU proceeds to step S205, and in a case where the CPU determines that the pedal operation amount is smaller than or equal to the threshold ac2, the CPU proceeds to step S208.

The processes in steps S205 to S208 are the same as those in the first embodiment and will not therefore be described. It is noted that in a case where negative determination is made in step S207, the CPU returns to step S221.

According to Variation 1, the following advantageous effect is provided:

(3) The wheel loader 100 includes an input section to which the operator inputs a command of an increase in the rotational speed of the engine 1, that is, the input section corresponds to the accelerator pedal operation amount detector 6*a*. The vehicle controller 8, when it determines that the engine restrictor has restricted the rotational speed of the engine 1 and the command has been inputted to the accelerator pedal operation amount detector 6*a*, controls the HST circuit to increase the vehicle speed of the vehicle.

Therefore, even when the engine controller 1*a* operates in the restricted state, the operator can step on the accelerator pedal 6 to cause the wheel loader 100 to operate.

(Variation 2)

In the first embodiment described above, the HST pump characteristic changing switch 20 is kept turned on. The HST pump characteristic changing switch 20 may instead be operable by the operator. In this case, the vehicle controller 8 further evaluates whether the HST pump characteristic changing switch 20 has been turned on as the condition that allows transition to the restricted mode in addition to the condition described in the first embodiment.

(Flowchart)

Figure 9:
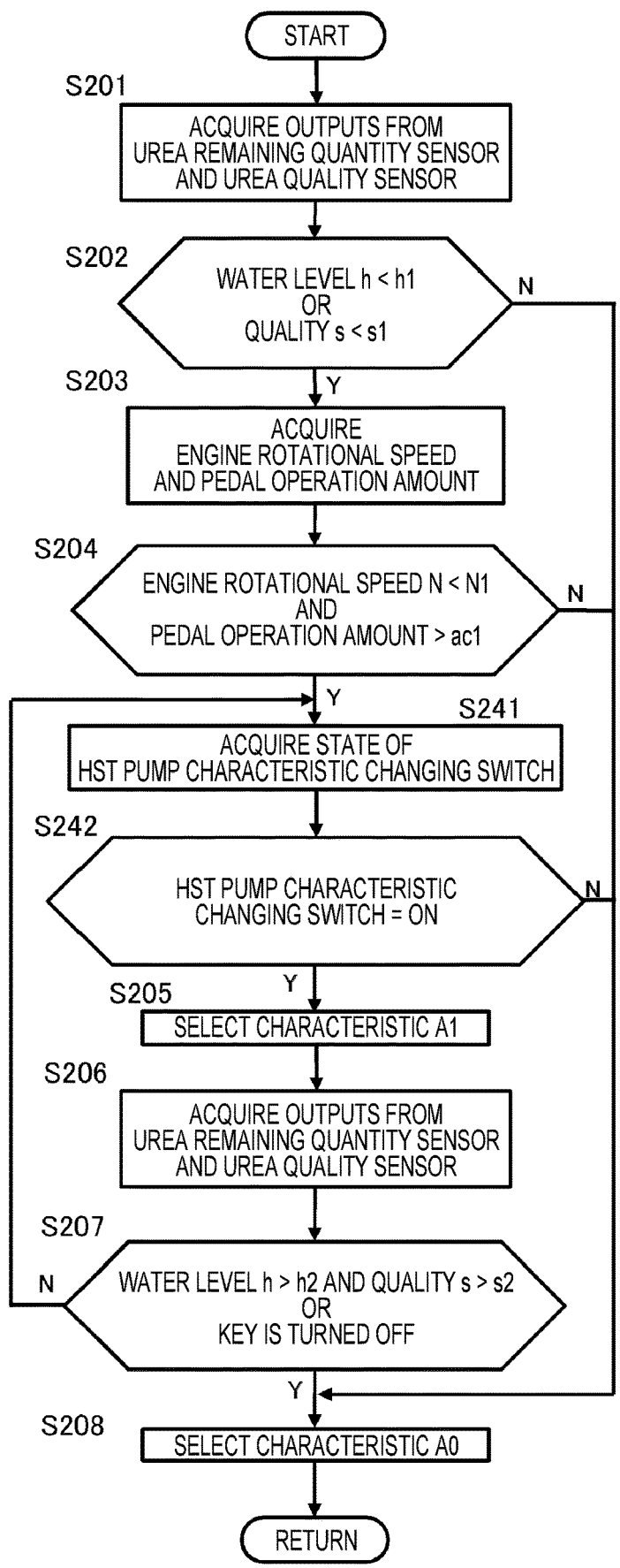
FIG. 9 is a flowchart showing the action of the action mode determining program in Variation 2.

FIG. 9 is a flowchart showing the action of the action mode determining program in Variation 2.

Steps S201 to S204 are the same as those in the first embodiment and will not therefore be described. In step S241, which is carried out when affirmative determination is made in step S204, the CPU reads the set state of the HST pump characteristic changing switch 20 and proceeds to step S242.

In step S242, the CPU evaluates whether or not the state of the HST pump characteristic changing switch 20 read in step S241 has been turned on. In a case where the CPU determines that the HST pump characteristic changing switch 20 has been turned on, the CPU proceeds to step S205, and in a case where the CPU does not determine that the HST pump characteristic changing switch 20 has been turned on, the CPU proceeds to step S208.

The processes in steps S205 to S208 are the same as those in the first embodiment and will not therefore be described. It is noted that in a case where negative determination is made in step S207, the CPU returns to step S241.

According to Variation 2, the operator can operate the HST pump characteristic changing switch 20 to switch the action mode of the vehicle controller 8 between the state in which the restricted mode is activated and the state in which the restricted mode is deactivated.

(Variation 3)

In the first embodiment described above, the engine controller 1*a* does not output information on the change in the action mode or information on the current action mode to the vehicle controller 8. The engine controller 1*a* may instead output information on the change in the action mode or information on the current action mode to the vehicle controller 8.

In this case, since the vehicle controller 8 does not need to estimate the action mode of the engine controller 1*a* based on the output from the accelerator pedal operation amount detector 6*a*, the rotational speed sensor 7, the urea remaining quantity sensor 18, or the urea quality sensor 19, the processes carried out by the vehicle controller 8 are simplified. For example, in a case where the engine controller 1*a* outputs information on the current action mode to the vehicle controller 8, the vehicle controller 8 also changes the action mode thereof in accordance with the action mode outputted by the engine controller 1*a*.

According to Variation 3, the action of the vehicle controller 8 can be simplified, and the change in the action mode of the engine controller 1*a* can be quickly sensed.

(Variation 4)

The reducing agent used by the wheel loader 100 is not limited to the urea water and may instead be an ammonia aqueous solution or any other reducing agent.

In the first embodiment, the HST circuit is formed of one hydraulic pump and one hydraulic motor and may instead be formed of a plurality of hydraulic pumps and/or a plurality of hydraulic motors. Further, instead of switching the volume characteristic of the hydraulic pump 2, the number of hydraulic pumps connected to the HST circuit may be changed.

Second Embodiment

A second embodiment of a wheel loader that is an HST vehicle according to the present invention will be described with reference to FIGS. 10 and 11. In the following description, the same components as those in the first embodiment have the same reference characters, and points different from those in the first embodiment will be primarily described. Points that will not be particularly described are the same as those in the first embodiment. The present embodiment primarily differs from the first embodiment in that the pump displaced volume is increased in accordance with the pedal operation amount.

The configuration of the wheel loader 100 differs from the configuration in the first embodiment in terms of the action of the program saved in the ROM of the vehicle controller 8.

The vehicle controller 8 determines the pump volume qp of the hydraulic pump 2 based on the pedal operation amount received from the accelerator pedal operation amount detector 6a and the rotational speed of the engine 1 detected with the rotational speed sensor 7. In the second embodiment, the pump volume qp is expressed by the sum of a base volume qb, which is determined in accordance with the engine rotational speed, and an increased volume qd, which is determined in accordance with the pedal operation amount. It is noted that the upper limit of the pump volume qp is qpmax, as in the first embodiment.

Figures 10A, 10B, 10C:
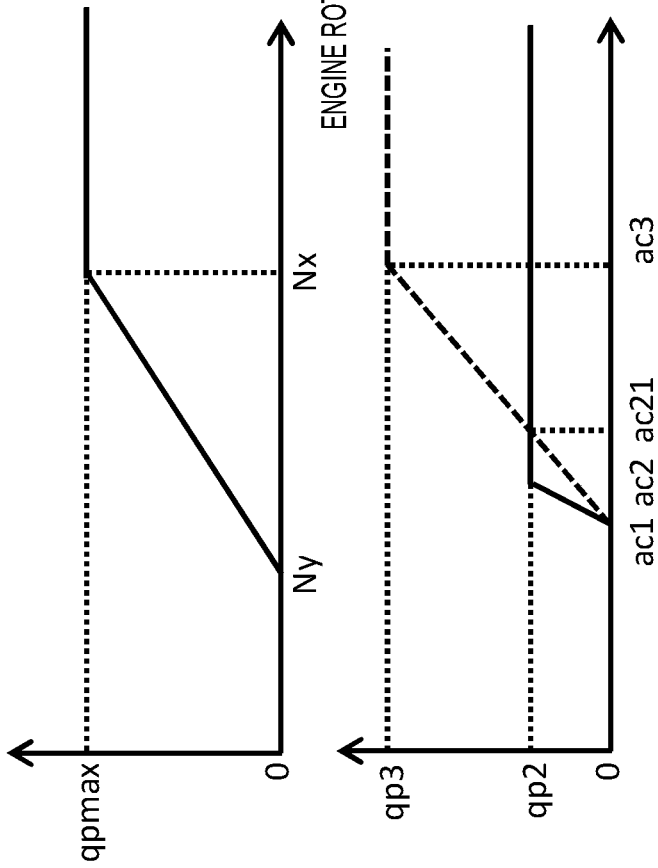
FIG. 10 shows the relationship among the pedal operation amount, the engine rotational speed, and the pump volume qp in a second embodiment.

FIG. 10 shows the relationship among the pedal operation amount, the engine rotational speed, and the pump volume qp. FIG. 10A shows the relationship between the engine rotational speed and the base volume qb. FIG. 10B shows the relationship between the pedal operation amount and the increased volume qd. FIG. 10C shows the relationship between the engine rotational speed and the pump volume qp.

The base volume qb is determined by the engine rotational speed irrespective of the action mode of the vehicle controller 8, as shown in FIG. 10A. The base volume qb is zero in the case where the engine rotational speed is lower than the low-idle speed Ny. The base volume qb linearly increases as the engine rotational speed increases to values higher than or equal to the low-idle speed Ny, and the base volume qb has the maximum constant value qpmax when the engine rotational speed is higher than or equal to the high-idle speed Nx.

The increased volume qd is determined by the action mode of the vehicle controller 8 and the pedal operation amount, as shown in FIG. 10B. In FIG. 10B, the solid line represents the characteristic of the increased volume qd in the normal mode, and the broken line represents the characteristic of the increased volume qd in the restricted mode. In the normal mode, the increased volume qd is zero in a case where the pedal operation amount is smaller than ac1, linearly increases in a case where the pedal operation amount is greater than or equal to ac1 but smaller than ac2, and has a constant value qp2 in a case where the pedal operation amount is greater than or equal to ac2. In the restricted mode, the increased volume qd is zero in the case where the pedal operation amount is smaller than ac1, linearly increases in a case where the pedal operation amount is greater than or equal to ac1 but smaller than ac3, and has a constant value qp3 in a case where the pedal operation amount is greater than or equal to ac3. In the restricted mode, the increased volume qd is qb2 in a case where the pedal operation amount is ac21. The pedal operation amount ac3 is greater than the pedal operation amount ac2, and qp3, which is the increased volume qd, is greater than qp2. It is noted that the ratio of the increase in the increased volume qd to the increase in the pedal operation amount is smaller in the restricted mode than in the normal mode.

FIG. 10C shows a representative characteristic of the pump volume qp, which is the sum of the base volume qb and the increased volume qd. The characteristic AO is the characteristic in the case where the pedal operation amount is zero irrespective of the action mode. Since the increased volume qd is zero, the pump volume qp is zero in the case where the engine rotational speed is the low-idle speed Ny. A characteristic A2 is the characteristic in the case where the pedal operation amount is greater than or equal to ac2 in the normal mode or in the case where the pedal operation amount is ac21 in the restricted mode. Since the increased volume qd is qb2, the pump volume qp is qp2 even in the case where the engine rotational speed is the low-idle speed Ny. A characteristic A3 is the characteristic in the case where the pedal operation amount is greater than or equal to ac3 in the restricted mode. Since the increased volume qd is qp3, the pump volume qp is qp3 even in the case where the engine rotational speed is the low-idle speed Ny.

In the cases of characteristics A2 and A3, the pump volume qp reaches qpmax before the engine rotational speed reaches the high-idle speed Nx and does not increase any more even when the engine rotational speed further increases. FIG. 10C shows only the three characteristic, but there are characteristics that continuously change in accordance with the pedal operation amount. That is, in the normal mode, one of the characteristics that fall within the range from A0 to A2 in FIG. 10C is set, and in the restricted mode, one of the characteristics that fall within the range from A0 to A3 in FIG. 10C is set.

(Flowchart)

Figure 11:
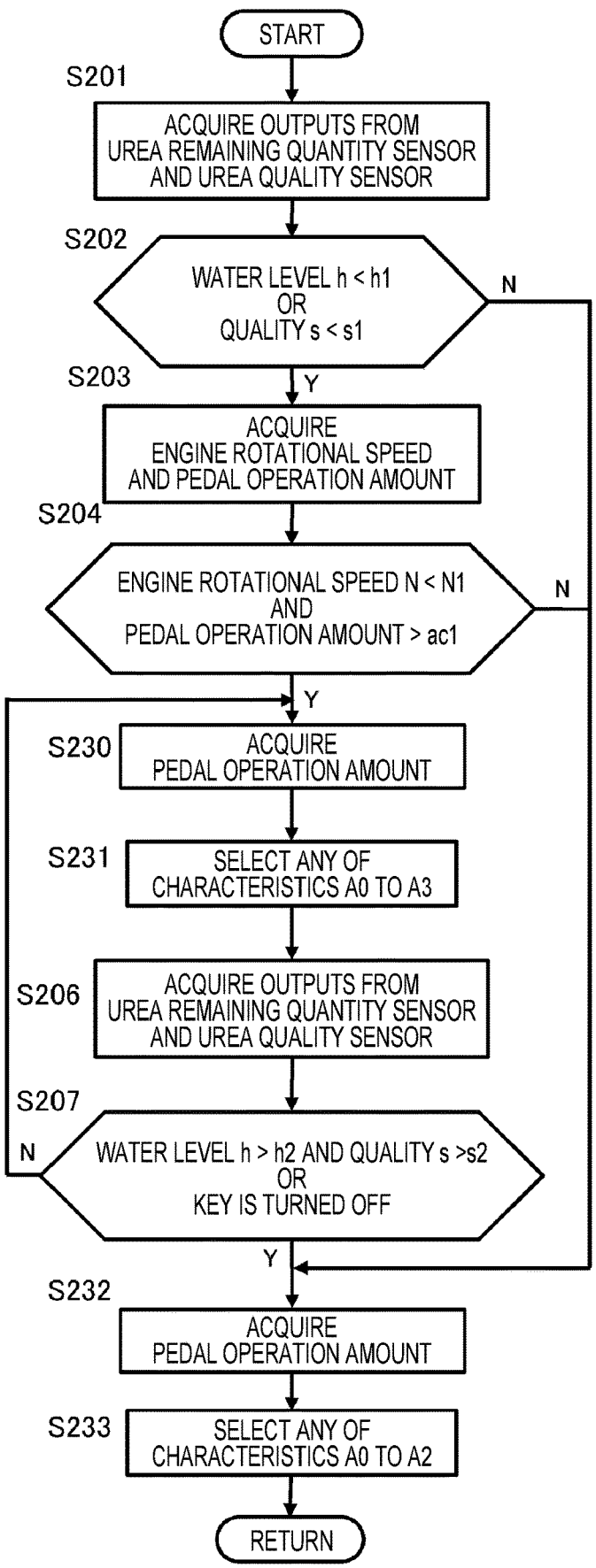
FIG. 11 is a flowchart showing the action of the vehicle controller 8 in the second embodiment.

FIG. 11 is a flowchart showing the action of the vehicle controller 8 in the second embodiment. The same processes as those in FIG. 7 in the first embodiment have the same step numbers and will not be described.

Steps S201 to S204 are the same as those in the first embodiment and will not be therefore described. In step S230, which is carried out when affirmative determination is made in step S204, the CPU reads the pedal operation amount of the accelerator pedal 6 in step S221 and proceeds to step S231.

In step S231, the CPU switches the action mode of the vehicle controller 8 to the restricted mode and determines the characteristic of the pump volume qp based on the pedal operation amount in such a way that the determined characteristic falls within the range from A0 to A3. To determine whether or not the restricted mode is maintained, steps S206 and S207 are then carried out. In step S207, in the case where affirmative determination is made, the CPU proceeds to step S232, whereas in the case where negative determination is made, the CPU returns to step S230.

The CPU reads the pedal operation amount of the accelerator pedal 6 in step S232 and proceeds to step S233.

In step S233, the CPU switches the action mode of the vehicle controller 8 to the normal mode, determines the characteristic of the pump volume qp based on the pedal operation amount in such a way that the determined characteristic falls within the range from A0 to A2, and stops the action of the program shown in FIG. 11, which shows the action of the program.

According to the second embodiment described above, since the pump volume qp is controlled in accordance with the pedal operation amount of the accelerator pedal 6 also in the restricted mode, fine adjustment of the vehicle speed can be performed.

Third Embodiment

A third embodiment of a wheel loader that is an HST vehicle according to the present invention will be described with reference to FIG. 12. In the following description, the same components as those in the first embodiment have the same reference characters, and points different from those in the first embodiment will be primarily described. Points that will not be particularly described are the same as those in the first embodiment. The present embodiment primarily differs from the first embodiment in that the volume of the hydraulic motor 3 is also changed in addition to the volume of the hydraulic pump 2.

The configuration of the wheel loader 100 differs from the configuration in the first embodiment in terms of the action of the program saved in the ROM of the vehicle controller 8.

The vehicle controller 8 decreases the motor volume of the hydraulic motor 3 in the restricted mode in addition to the action in the first embodiment. For example, in the normal mode, the motor volume is set at Mqp0, and in the restricted mode, the motor volume is set at Mqp, which is smaller than Mqp0. When the action described above is reflected in the flowchart of FIG. 7 in the first embodiment, the motor volume is set at Mqp' in step S205, and the motor volume is set at Mpg0 in step S208.

(Action Example)

An action example in the third embodiment will be described with reference to FIG. 12.

Figure 12:
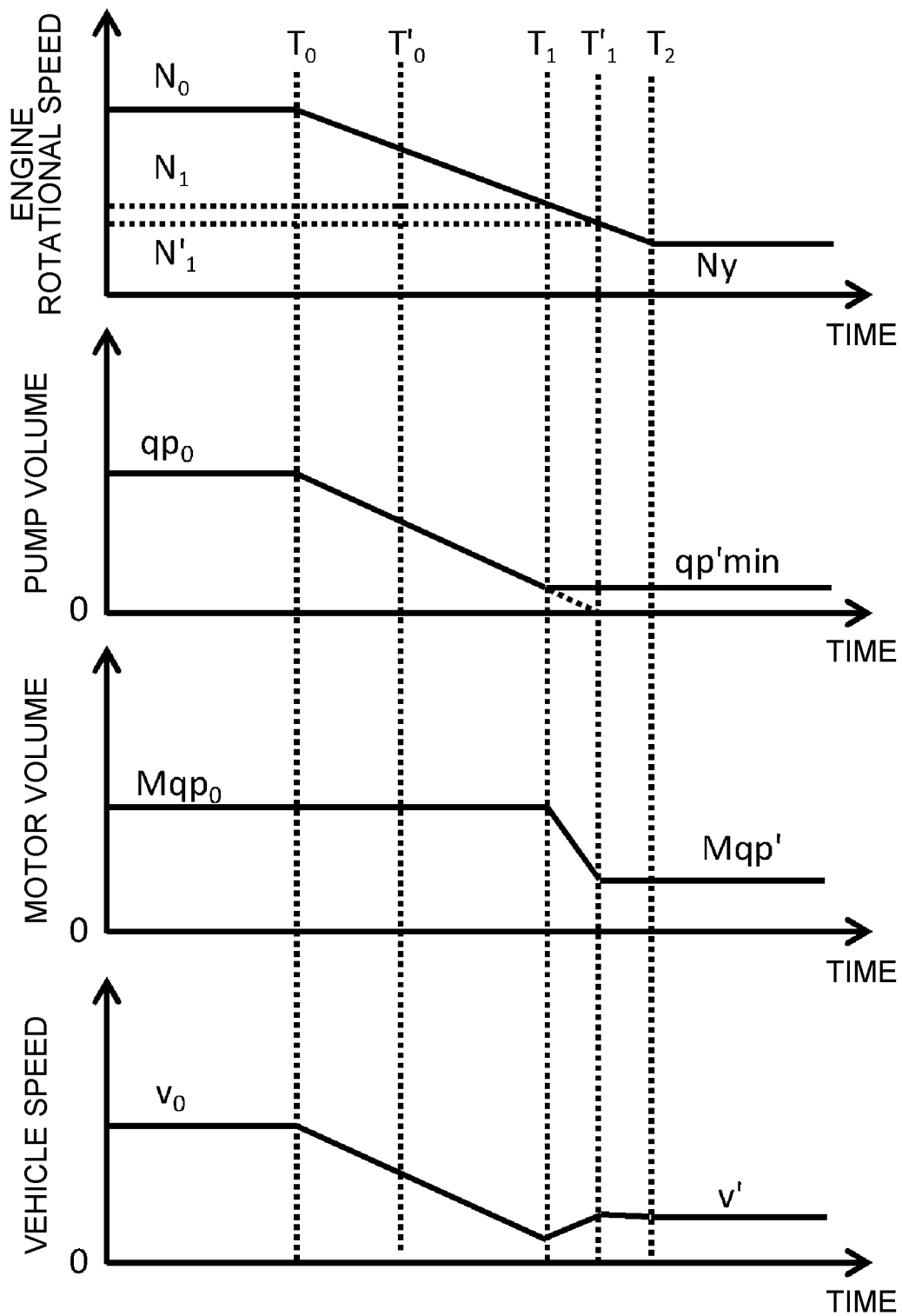
FIG. 12 shows an action example in a third embodiment.

FIG. 12 shows the time-series behavior of the wheel loader 100 in the case where the engine controller 1a transitions to the restricted mode during travel. FIG. 12 shows, from above to below, how the engine rotational speed, the pump volume, the motor volume, and the vehicle speed change with time. It is noted that the pedal operation amount is always greater than the predetermined threshold ac1.

At time T0, for example, the quantity of remaining urea water is smaller than a predetermined threshold, and the engine controller 1a starts lowering the target rotational speed of the engine 1 toward the low-idle speed Ny. The vehicle controller 8, however, maintains the normal mode because the engine rotational speed is greater than N1.

At time T'0, the target rotational speed of the engine 1 keeps lowering toward the low-idle speed Ny, but the vehicle controller 8 maintains the normal mode because the engine rotational speed is still greater than N1 (NO in step S204 and transition to step S208 in FIG. 7).

At time T1, the vehicle controller 8 transitions to the restricted mode because the engine rotational speed is lower than N1 and the pedal operation amount is greater than the threshold ac1 (YES in step S204 and transition to step S205 in FIG. 7). In a case where the engine rotational speed N1 is the speed corresponding to the pump volume qp'min, the pump volume after the time T1 has the constant value qp'min, as shown in FIG. 12. Further, since the motor volume is set at Mqp', which is smaller than Mqp0 in the normal mode, the motor volume starts decreasing.

At time T'1, the change in the motor volume to Mqp' is completed. Look now at the vehicle speed shown in the lowest portion of FIG. 12, and the vehicle speed having decreased since the time T0 increases from the time T1 to the time T'1 because the engine controller 1a has transitioned to the restricted mode. The reason for this is that the pump volume is constant but the motor volume decreases. However, since the engine rotational speed keeps decreasing, the vehicle speed decreases after the time T'1.

Thereafter, the engine rotational speed reaches the low-idle speed Ny at time T2, and the vehicle speed becomes constant.

According to the third embodiment, the following advantageous effect is provided in addition to the effects in the first embodiment.

The vehicle controller 8, when it determines that the engine controller 1a operates in the restricted mode, increases the volume of the HST pump (hydraulic pump) 2 but decreases the volume of the HST motor, and the vehicle speed of the wheel loader 100 can therefore be further increased, as compared with the vehicle speed in the first embodiment, in which the volume of the HST motor is not decreased.

(Variation of Third Embodiment)

In the third embodiment described above, the vehicle controller 8 controls both the pump volume of the hydraulic pump 2 and the motor volume of the hydraulic motor 3 in the restricted mode differently from the control in the normal mode. The vehicle controller 8 may instead control only the motor volume of the hydraulic motor 3 in the restricted mode differently from the control in the normal mode. That is, the vehicle controller 8 determines the pump volume of the hydraulic pump 2 based on the engine rotational speed in the restricted mode as in the normal mode but decreases the motor volume of the hydraulic motor 3 in such a way that the wheel loader 100 can travel by itself.

The embodiments and variations described above may be combined with each other.

A variety of embodiments and variations have been described above, but the present invention is not limited to the contents thereof. Other aspect conceivable within the technical idea of the present invention falls within the scope of the present invention.

REFERENCE SIGNS LIST

1 Engine
1a Engine controller (engine restrictor)
2 Hydraulic pump
3 Hydraulic motor
6 Accelerator pedal
6a Accelerator pedal operation amount detector
8 Vehicle controller (control unit)
15 HST circuit
18 Urea remaining quantity sensor (reducing agent sensor)
19 Urea quality sensor (reducing agent sensor)
20 HST pump characteristic changing switch
100 Wheel loader (work vehicle)

The invention claimed is:

1. A work vehicle comprising:
an engine;
a rotational speed sensor that detects a rotational speed of the engine;
a hydraulic pump driven by the engine, a hydraulic motor driven with hydraulic oil discharged from the hydraulic pump to drive wheels, and an HST circuit in which the hydraulic pump and the hydraulic motor are connected to each other in a form of a closed circuit;
an accelerator pedal and an accelerator pedal operation amount detector that detects a pedal operation amount by which the accelerator pedal is operated;
a reducing agent sensor that detects a state of a reducing agent used to clean exhaust gas from the engine;
an engine restrictor that restricts the rotational speed of the engine based on an output from the reducing agent sensor; and
a control unit that is connected to the reducing agent sensor, the rotational speed sensor, and the accelerator pedal operation amount detector and controls the hydraulic pump or the hydraulic motor, wherein
in a case where an output value from the reducing agent sensor does not satisfy a predetermined condition, the engine rotational speed outputted by the rotational speed sensor is lower than a predetermined speed, and the pedal operation amount outputted by the accelerator pedal operation amount detector is greater than a predetermined threshold, the control unit determines that the engine restrictor has restricted the rotational speed of the engine and changes a tilting angle of the hydraulic pump or the hydraulic motor independently of the rotational speed of the engine to the tilting angle associated with minimum travel drive force necessary for self-travel of the work vehicle.

2. The work vehicle according to claim 1, wherein
the hydraulic pump includes a hydraulic pump regulator that increases or decreases volume of the hydraulic pump, and
when the control unit determines that the engine restrictor has restricted the rotational speed of the engine, the control unit outputs a signal that increases a volume of the hydraulic pump to the hydraulic pump regulator.

3. The work vehicle according to claim 1, wherein
the hydraulic motor includes a hydraulic motor regulator that increases or decreases volume of the hydraulic motor, and
when the control unit determines that the engine restrictor has restricted the rotational speed of the engine, the control unit outputs a signal that decreases a volume of the hydraulic motor to the hydraulic motor regulator.

4. The work vehicle according to claim 1, wherein
the work vehicle further comprises an input section to which a command of an increase in the rotational speed of the engine is inputted, and
when the control unit determines that the command greater than or equal to a predetermined value has been inputted to the input section, the control unit changes the tilting angle to the tilting angle associated with minimum travel drive force necessary for self-travel of the work vehicle.

5. The work vehicle according to claim 1, wherein
in the case where the rotational speed of the engine is restricted, the control unit maintains the tilting angle of the hydraulic pump or the hydraulic motor to be the tilting angle associated with minimum travel drive force necessary for self-travel of the work vehicle even when the pedal operation amount outputted by the accelerator pedal operation amount detector becomes zero.

* * * * *